United States Patent [19]

Patrick, Jr.

[11] Patent Number: 4,464,305
[45] Date of Patent: Aug. 7, 1984

[54] PROCESS FOR THE RECOVERY OF FATTY ACIDS FROM DISCARDED SOLID SOAP MATERIALS

[76] Inventor: Charles H. Patrick, Jr., P.O. Box 1926, Greenville, S.C. 29602

[21] Appl. No.: 421,975

[22] Filed: Sep. 23, 1982

[51] Int. Cl.$^3$ .............................. C09F 5/00; C11B 1/00
[52] U.S. Cl. ................................... 260/412; 260/412.6
[58] Field of Search ............................... 260/412, 412.6

[56] References Cited

U.S. PATENT DOCUMENTS

| | | | |
|---|---|---|---|
| 1,889,652 | 11/1932 | Gensecke | 260/412 |
| 2,171,198 | 8/1939 | Urbain et al. | 260/412 |
| 2,171,201 | 8/1939 | Urbain et al. | 260/412 |
| 2,171,202 | 8/1939 | Urbain et al. | 260/412 |

*Primary Examiner*—Y. Harris-Smith
*Attorney, Agent, or Firm*—Bailey & Hardaway

[57] ABSTRACT

A process for the recovery of fatty acids from discarded solid soap material comprises the steps of:
(a) stirring discarded solid soap material into a melt of one or more fatty acids at the melting temperature of the discarded soap which is usually from about 40° C. to about 180° C. until the soap material has dissolved in the fatty acid melt;
(b) adding to the thus-produced solution of soap material in the fatty acid melt an amount of an undiluted acid sufficient to convert the soap material to free fatty acid and form one or more alkali metal salts, and heating and stirring at about 40° C. to about 180° C. to produce free fatty acid and one or more alkali metal salts;
(c) separating the freed fatty acid in the fatty acid melt from the thus-produced salt of one or more alkali metals; and
(d) refining freed fatty acids using filtration, distillation, decolorization, deodorization, etc.

It is preferred that the lower melt temperatures be utilized to avoid discoloration, but time requirements dictated by the varying composition of the soap may make the use of the more elevated temperatures expedient.

12 Claims, 1 Drawing Figure

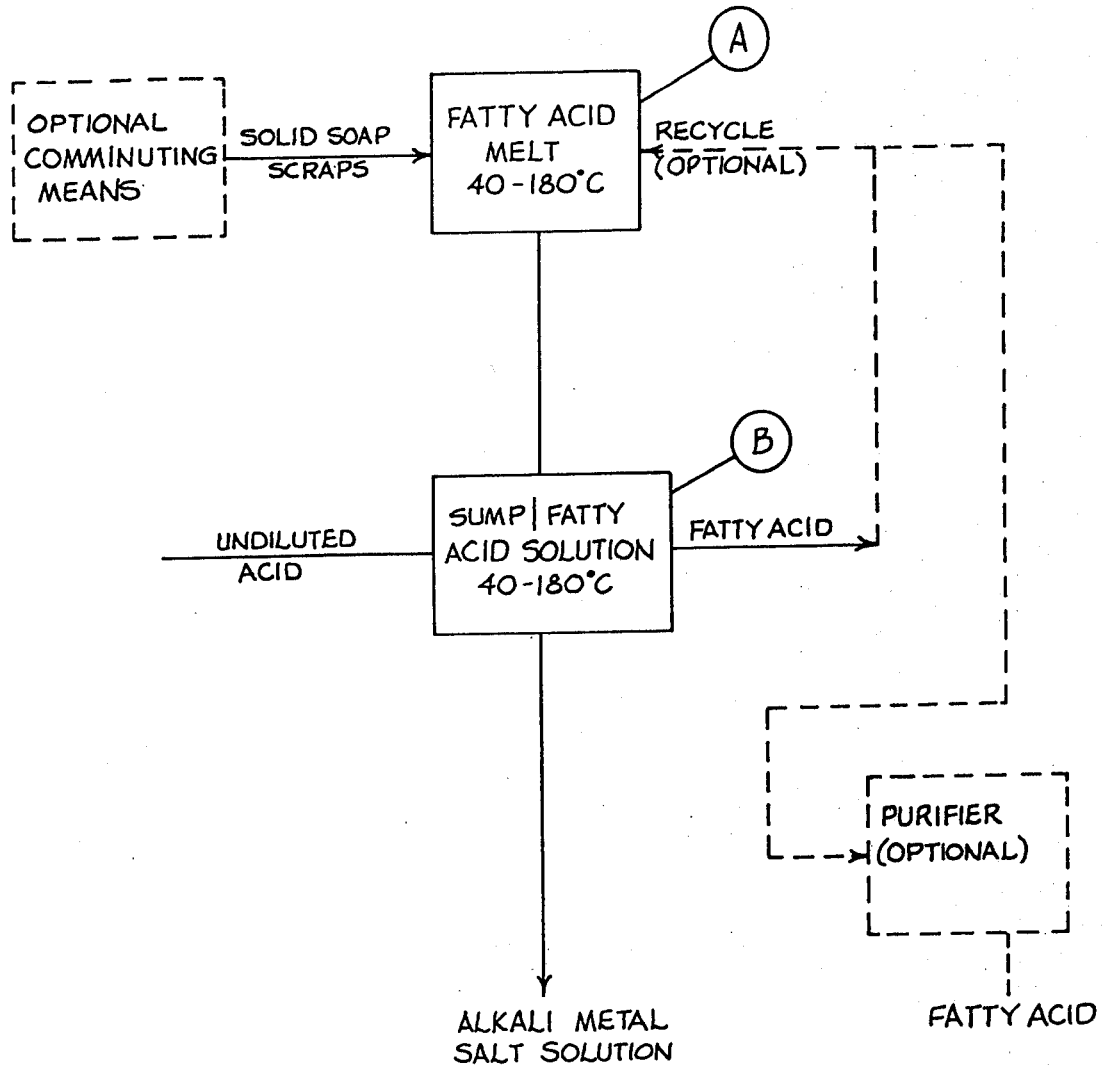

PROCESS FOR THE RECOVERY OF FATTY ACIDS FROM DISCARDED SOLID SOAP MATERIALS

BACKGROUND OF THE INVENTION

This invention relates to utilization of discarded solid soap materials, such as retrieved from hotels or motels or any other source of discarded soap and the like, to obtain free fatty acids for other fields of use.

It has been proposed by Gueant et al. (U.S. Pat. No. 4,018,805) to convert soaps to corresponding fatty acids by treating a mixture of molten soaps and a diluent fatty acid mixture with a relatively dilute solution of a mineral acid and to separate fatty acid from a solution of mineral salt formed during the reaction.

Red et al. have proposed, in U.S. Pat. No. 4,118,407, a process for recovery of fatty acids from soap stocks, in which saponified soapstock is acidulated with an inorganic acid and the products separated. It has further been proposed that a relatively dilute aqueous solution of mineral salts, resulting from the reaction, be concentrated and used in paper processing, to dispose of an otherwise unacceptable effluent material in an economically and ecologically acceptable manner.

Recovery of soaps, or corresponding fatty acids, from soapy solutions of the kind obtained in waste liquors from soap manufacturing plants or laundries has been considered by Gibbs (U.S. Pat. No. 2,637,727), Peck (U.S. Pat. No. 1,349,530) and Gray (U.S. Pat. No. 1,242,435). In each case a relatively dilute material is treated to permit recovery of soap or fatty acid and to decrease an effluent problem. However, it is well known that handling large volumes of soapy effluents is inefficient and is accompanied by problems in handling emulsions and frothy materials.

Recovery and refining of fatty acids from soap stocks, within the context of saponification of commercially-used fats and oils, is addressed by Cox et al. (U.S. Pat. No. 2,812,343). Wengrow et al. (U.S. Pat. No. 3,804,819) and Phillips et al. (U.S. Pat. No. 4,100,181). These processes generally require saponification, acidulation and one or more extraction steps.

Akers et al. have proposed in U.S. Pat. No. 4,259,251, treating effluent containing fatty matter by extraction with a nonpolar solvent to concentrate fatty matter and saponification of the fatty matter to produce fatty acid soaps.

Recovery of fatty acids from liquid laundry wastes containing the same has been proposed by Urbain et al. in U.S. Pat. Nos. 2,171,198; 2,171,200; 2,171,201 and 2,171,202. The proposed procedures provide for handling dilute soap solutions and involve one or more filtration or decolorization steps, along with treatment with dilute acid.

Although it is conventional in the hospitality industry to provide one or more cakes of soap to each guest in a motel, hotel or inn, no procedure is currently employed to recover unused soap or to obtain any useful products therefrom. On the contrary, soap remnants are given to custodial personnel or discarded in the trash. Similarly, partially used soap cakes dispensed to patients in hospitals and nursing homes are discarded or incinerated. There is therefore a need for a method of recovering, economically, useful materials from soap materials heretofore discarded in the hotel industry.

OBJECT OF THE INVENTION

It is an object of the invention to provide a process for obtaining useful materials, that is, fatty acids, from solid soap materials heretofore discarded by hotels and motels.

SUMMARY OF THE INVENTION

This invention relates to a process for recovering fatty acids from discarded solid soap material, which comprises the steps of:

(a) stirring discarded solid soap material into a melt of one or more fatty acids at about 40° C. to about 180° C. until the soap material has dissolved in the fatty acid melt;

(b) adding to the thus-produced solution of soap material in the fatty acid melt an amount of an undiluted acid sufficient to convert the soap material to free fatty acid and form one or more alkali metal salts, and heating and stirring at about 40° C. to about 180° C. to produce free fatty acids and one or more alkali metal salts; and, (c) separating the freed fatty acids in the fatty acid melt from the thus-produced salt of one or more alkali metals.

BRIEF DESCRIPTION OF THE DRAWING

In the FIGURE is shown a schematic representation of the process of this invention.

DETAILED DESCRIPTION

"Discarded solid soap material," as used in the specification and claims, means partially used bars of soap, retrieved from hotels, motels and similar establishments, or any other source of discarded soap and the like, and collected at a processing location. It will be understood that toilet soaps, as used in the hotel industry, generally comprise sodium and/or potassium salts of higher fatty acids, more particularly of fatty acid mixtures of 10–20 carbon atoms. "Fatty acid," as used herein, includes both saturated and unsaturated acids of the requisite number of carbon atoms. Preferably, the fatty acids being recovered will be lauric, myristic, palmitic, stearic, arachidic, oleic and linoleic acids, including mixtures thereof.

The incompletely-used toilet soap bars contain, in addition to sodium and/or potassium soaps of fatty acids, colorants, fragrances, emollients, deodorants, germicides, pigments and other additives. Soap bars also contain minor amounts of the order of 5–20% by weight, of water. Accordingly, it has been found that treatment of these discarded solid soap bars at very high temperatures, above about 200° C., results in oxidation or other objectionable changes which interfere with recovery of high quality fatty acids therefrom. For this reason, the discarded fatty acid material is added to a melt of fatty acids, generally of about the same composition as the fatty acids being liberated by the process of this invention, so as to minimize exposure to unacceptably high temperatures. In order to facilitate dissolution of the remnants of soap material, it is preferred that the collected soap bars be chipped, ground or otherwise comminuted into small particles, which are added to the fatty acid melt.

The fatty acid melt is maintained at a temperature sufficient to keep the fatty acid mixture in the liquid state, and this may be approximately 40° C. to 180° C. depending upon the composition of the melt. This temperature will be selected according to the fatty acid mixture being used as the diluent for the process and to the required temperture for melting the soap. However, for mixtures containing lauric, palmitic and stearic acids, higher temperatures may be required. Because the higher fatty acids tend to volatilize at temperatures above their melting points, it is preferred to carry out the reaction in a pressurized or closed vessel.

Although the fatty acid melt functions as a diluent for the discarded soap material, it is preferred, so as to obtain dissolution of the soap material within a reasonable time, to employ weight ratios of soap material to fatty acid melt of 3:1 to 0.1:1. Most preferred are weight ratios of 2:1 to 1:1.

At the temperatures indicated, dissolution of the soap material in the fatty acid melt will require 15 to 120 minutes or more, probably 30 to 90 minutes, depending on the composition and the quantity of the soap.

After dissolution is complete, an undiluted strong acid is added to the solution of soap material in the fatty acid or mixture of fatty acids. It has been found that undiluted mineral acids, such as concentrated sulfuric, hydrochloric or phosphoric acids, are preferred. Also preferred is glacial acetic acid and citric acid.

The acids are used in an amount sufficent to convert the soap material completely to free acid. This amount can be determined for any batch of discarded soap material from the neutralization equivalent of a sample. It will be preferred, to assure complete conversion of soap material to fatty acids, to employ a slight excess of acid, preferably of the order of 5–10% above the stoichiometeric quantity theoretically required for complete conversion of fatty material to fatty acids.

The other product obtained from the reaction between soap material and acid is a salt. In a typical case, assuming that the soap material is sodium stearate and the acid is sulfuric acid, the reaction can be represented by the equation:

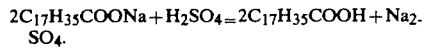

$$2C_{17}H_{35}COONa + H_2SO_4 = 2C_{17}H_{35}COOH + Na_2SO_4.$$

After addition of the acid to the solution of soap material in the fatty acid melt, the resulting mixture is stirred and heated until conversion of the soap material to fatty acid is complete. Generally, this will require approximately 15 to 60 minutes or more at about 40° C. to about 180° C. or more. In general, the higher reaction temperatures will be preferred so as to shorten the reaction time and maximize throughput in a given piece of equipment.

After the liberation of fatty acids has been completed, the fatty acids are separated from a highly concentrated solution of alkali metal salts in water. This can conveniently be accomplished by collecting an upper portion (fatty acid mixture) through an upper exit means in the reactor and a lower fraction (aqueous salt solution) through a collecting means at the bottom of the reactor.

Frequently, the fatty acids thus obtained are discolored from impurities and additives present in the soap material being treated. It has been found that these impurities can be rendered unobjectionable by treating the fatty acids, before resolidification, with an oxidizing agent or with a reducing agent. Typical of oxidizing agents is hydrogen peroxide. Reducing agents which can be used include, but are not limited to, sodium hydrosulfite and sodium formaldehyde sulfoxylate. Other desired refining steps may be carried out on the freed fatty acids such as filtration, distillation, decolorization, deodorization, etc.

The fatty acids recovered in accordance with the invention can be further purified into more or less homogeneous fractions, for example, by distillation. The thus-obtained homogeneous fractions can be used for any purpose for which fatty acids are normally used, e.g., making surfactants or textile chemicals such as polyethoxylated or polypropoxylated derivatives or esters with phenols or alkanols. If desired, the fatty acid mixtures liberated by the practice of this invention can be resaponified and the resulting soaps sold to distributors or to ultimate consumers.

It will be appreciated that the process of this invention, which employs no water in addition to that in the discarded soap material and the strong acid used, provides an efficient process for freeing high quality fatty acids from soaps. The process requires smaller volumes of materials per unit amount of soap converted than prior art processes and avoids frothing and emulsification typical of conventional methods. In addition, the aqueous effluent obtained is considerably more concentrated than obtained by known procedures.

As shown in the FIGURE, fatty acid melt is kept at approximately 40°–180° C. in the vessel represented by A. To this stirred vessel is added solid soaps, preferably comminuted into pellets or coarse powders. The fatty acid melt is preferably obtained by recycling fatty acid products from a previous run or by retaining a portion of the fatty acid product in the reactor.

The homogeneous solution of soap material and molten fatty acids may be transferred to another vessel, represented by B. Alternatively and preferably, the process of this invention will be done in one reactor vassel without a transfer step. To the homogeneous mixture of soap material in fatty acids, stirred and heated at approximately 40°–180° C., is added a slight excess of undiluted acid beyond that required to free fatty acids from the soap material. At the end of the reaction, the resulting aqueous metal salt solution is removed and fatty acid product ultimately may be separated. Further purification of the fatty acid product, e.g., decolorization, is preferred.

DESCRIPTION OF MOST PREFERRED EMBODIMENT

In a most preferred embodiment, the process of this invention will be that wherein the discarded soap material is comminuted before addition to the fatty acid melt, the ratio of discarded soap material to fatty acid melt is 2:1 to 1:1 by weight, the discarded soap materials comprises sodium and/or potassium salts of saturated and unsaturated acids of 10–20 carbon atoms, and the undiluted acid is sulfuric acid, hydrochloric acid, phosphoric acid or acetic acid.

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

Chopped soap bar scraps collected by a hotel chain (1 pound) were added to a melt of tallow and coconut carbon fatty acids (1 pound), stirred at 100° C. and raised to a temperature of 150° C. After 45 minutes, dissolution of the soap material in the fatty acid melt was complete. To the resulting homogeneous solution was added one-quarter pound (105% of theoretical) of concentrated sulfuric acid. The resulting mixture was stirred at 105° C. and increased as a result of exotherm to 130° C. for 15 minutes. The fatty acid product was decanted from the aqueous solution of sodium and potassium sulfates.

EXAMPLE 2

Toilet soap remnants collected from hotels as in Example 1 were chipped into small pieces. The resulting pieces (1 pound) were added to a blend of tallow and coconut carbon fatty acids, recovered from Example 1 (1 pound), at 100° C. and increased as a result of exotherm to 130° C. After dissolution was complete (45 minutes), sulfuric acid (¼ pound, 105% of theoretical) was added to the stirred and heated mixture. The temperature was elevated to 130° C. for 15 minutes. The fatty acid melt which was recovered is decolorized by treatment with sodium hydrosulfite.

The preceding examples can be repeated with similar success by substituting the generically or specifically described reactants and/or operating conditions of this invention for those used in the preceding examples.

From the foregoing description, one skilled in the art can ascertain the essential characteristics of this invention and, without departing from the spirit and scope thereof, can make various changes and modifications on the invention to adapt it to various usages and conditions.

What is claimed is:

1. A process for the recovery of fatty acids from discarded solid soap material, comprising the steps of:
   (a) disolving discarded solid soap material into a melt of one or more fatty acids at about 40° C. to about 180° C. until the soap material has dissolved in the fatty acid melt,
   (b) adding to the thus-produced solution of soap material in the fatty acid melt an amount of an undiluted organic or inorganic acid sufficient to convert the soap material to free fatty acids and form one or more alkali metal salts and heating and stirring at about 40° C. to about 180° C. to produce free fatty acid and one or more alkali metal salts; and
   (c) separating the freed fatty acids in the fatty acid melt from the thus-produced salt of one or more alkali metals.

2. The process of claim 1, wherein the acid is sulfuric acid, hydrochloric acid, phosphoric acid or acetic acid.

3. The process of claim 1, wherein the fatty acid melt in step (a) is product recycled from a previous cycle of liberating fatty acid from solid soap material.

4. The process of claim 1, wherein the discarded soap material is comminuted before addition to the fatty acid melt.

5. The process of claim 1, wherein the weight ratio of discarded fatty acid material to fatty acid melt is 2:1 to 1:1.

6. The process of claim 1, wherein the discarded soap material comprises sodium and/or potassium salts of saturated and unsaturated acids of 10-20 carbon atoms.

7. The process of claim 1, including the step of treating the product from step (c) with a reducing agent.

8. The process of claim 1, including the step of treating the product of step (c) with an oxidizing agent.

9. The process of claim 1, wherein the discarded soap material is comminuted before addition to the fatty acid melt, the ratio of discarded soap material to fatty acid melt is 2:1 to 1:1 by weight, the discarded soap material comprises sodium and/or potassium salts of saturated and unsaturated acids of 10-20 carbon atoms, and the acid is sulfuric acid, hydrochloric acid, phosphoric acid or acetic acid.

10. The process of claim 9, wherein fatty acid melt in step (a) is product recycled from a previous cycle of liberating fatty acid from discarded soap material.

11. The process of claim 9, wherein steps (a) and (b) are carried out in a pressure reactor at a temperature of 150° C. to 180° C.

12. The process of claim 9, wherein steps (a) and (b) are carried out in a closed reactor at a temperature of 150° C. to 180° C.

* * * * *